United States Patent [19]
Pierson

[11] 3,914,859
[45] Oct. 28, 1975

[54] METHOD OF FABRICATING CLOSED SLOT STATOR CONSTRUCTION PARTICULARLY ADAPTED FOR STEPPER MOTORS

[76] Inventor: Ray T. Pierson, 11941 Reagan St., Los Alamitos, Calif. 90720

[22] Filed: Jan. 17, 1974

[21] Appl. No.: 434,354

[52] U.S. Cl. ............ 29/596; 29/606; 310/42; 310/218; 310/256
[51] Int. Cl.² ............................... H02K 15/02
[58] Field of Search ........ 29/596, 598, 606; 310/42, 310/43, 218, 254, 256, 154, 155, 156

[56] References Cited
UNITED STATES PATENTS

| | | | |
|---|---|---|---|
| 1,957,380 | 5/1934 | Barlow | 29/596 |
| 2,506,629 | 5/1950 | Bilde et al. | 310/42 X |
| 2,607,816 | 8/1952 | Ryder et al. | 29/596 X |
| 2,695,969 | 11/1954 | Yates | 29/596 UX |
| 3,087,080 | 4/1963 | Isaacson | 310/42 X |
| 3,502,914 | 3/1970 | Cox | 29/596 X |

*Primary Examiner*—Carl E. Hall

[57] ABSTRACT

A closed slot stator construction for stepper motors and method of fabricating the same. The method involves utilizing a tubular member. Axial slots are milled in the outside surface of the tube. Preformed stator teeth are then assembled by edges inserted into the axial slots with the teeth positioned radially. The interior of the tube is then milled, exposing the inner edges of the teeth. Windings are then placed between these stator teeth or wound on them by machine. The assembly is then press fitted into a magnetic sleeve which forms the housing. In a modified form of the invention, the stator is formed by insertion of stamped stator teeth into a sintered metal or plastic mold with the holding cylinder cast around the radially positioned teeth, thus, eliminating soldering.

2 Claims, 5 Drawing Figures

METHOD OF FABRICATING CLOSED SLOT STATOR CONSTRUCTION PARTICULARLY ADAPTED FOR STEPPER MOTORS

SUMMARY OF THE DISCLOSURE

The invention resides in the field of methods of construction of electrical motors, and more particularly, the specific embodiments relate to the construction of stators of variable reluctance type stepper motors.

BACKGROUND OF THE INVENTION

Attention is called to the following U.S. Pat. Nos. 587,869; 1,114,361; 2,607,816; 2,711,008; 2,784,333; 2,804,680; 2,871,384; 3,056,896; 3,212,170; 3,317,768; 3,502,914; 3,559,012; and 3,628,239.

Preferred, exemplary embodiments of the invention are described in detail hereinafter. In the exemplary embodiments of the invention, the stator of the motor is not of laminated construction, this being a significant feature. The stator is of a closed slot type, meaning that the stator teeth are closed or shorted at their inner ends, rather than being open for insertion of the coils or windings at the inner ends. In the embodiments disclosed, coils or windings are inserted from the outer ends of the stator teeth, after which the assembly is inserted into a casing which provides for the magnetic circuit, and at the same time, serves as a housing.

The invention resides primarily in methods of construction of the motor and more particularly, the stator. In a preferred embodiment, equally spaced axial slots are formed in the outside of a brass or copper tube or cylinder. Stator teeth, in the form of metal stampings, then have an edge inserted in the axial slots and are secured thereto. Then, the windings or coils may simply be inserted between the teeth, after which the assembly is inserted into a magnetic cylinder which completes the magnetic path and serves as a housing.

Modified forms of the invention are described in detail hereinafter. The invention is calculated to realize a number of important objects as follows. A primary object is to reduce the material and labor costs involved in the construction of motors, particularly, stepper motors.

A further object is to reduce the labor content by making it possible to simply insert the coils into the stack from the outside diameter.

A further object is to realize a motor of the type referred to which does not require laminated stator construction.

A further object is to eliminate the difficullty of construction of motors of this type involved in the insertion of windings between stator teeth between the inner ends of the teeth.

Another object is to make possible and realize the capability of constructing a satisfactory motor using less expensive materials.

A further object is to make possible the construction of a motor of the type desired which does not require the use of high silicon content iron.

Another object is to make possible a method of construction wherein the stator teeth can be constructed of standard screw machine stock steel.

Another object is to realize a method wherein the foregoing objects are achieved by way of securing or bonding teeth in an equally angularly spaced circular array to a ring shaped member, the inner ends of the teeth being secured to the ring shaped member.

Another object is to realize a method as in the foregoing wherein the ring shaped member is formed as a tube in which equally angularly spaced axial slots are formed; the inner edges of the teeth are fitted into slots and secured thereto; and the interior of the tube is then milled to expose the inner edges of the teeth.

BRIEF DESCRIPTION OF THE DRAWINGS

Further objects and additional advantages of the invention will become apparent from the detailed description and annexed drawings, wherein.

DESCRIPTION OF THE PREFERRED EMBODIMENT

Figure 1:
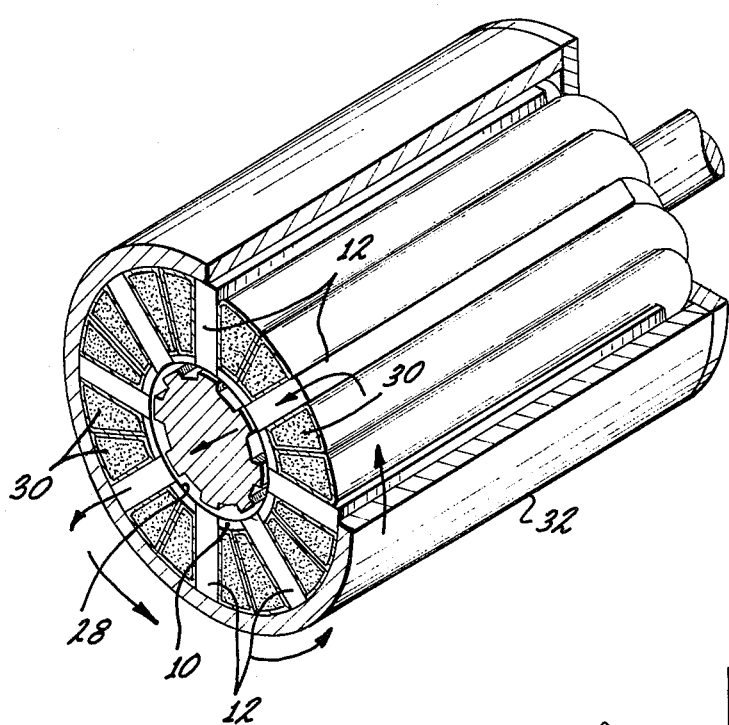
FIG. 1 is a sectional, isometric view of a preferred form of the invention.
Figure 2:
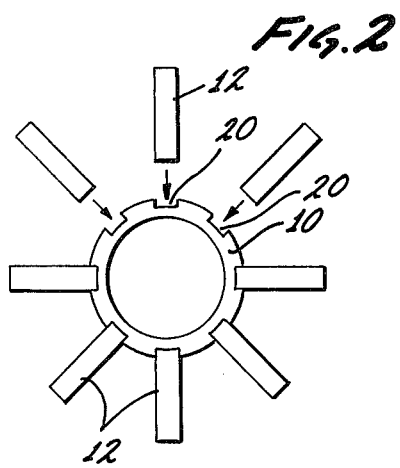
FIG. 2 is a schematic, exploded view illustrating a step of the method.

The invention resides in the method of construction or fabrication as well as in the finished product.

As shown in FIGS. 1 through 4, numeral 10 designates a metal tube of the desired size which serves to hold the stator teeth, there being eight stator teeth in the exemplary embodiment equally spaced around the tube and lying along radii. The tube may be of brass or other suitable material. The position of the teeth is such as to accommodate the insertion of copper wire coils from the outside or from the periphery of the stator, the winding receiving slots being closed at the inner periphery as will be described. The cylinder may be fabricated from brass or copper, or possibly aluminum, since it must be nonmagnetic and have wettability for silver soldering or high temperature soldering as will be described.

An alternative to the soldered construction is that the stator teeth may be stamped and then be inserted into a sintered metal or plastic mold with the holding cylinder cast around the teeth. This alternative eliminates soldering. FIG. 5 illustrates such an alternative, showing cast ring 14 having edge portions of stamped stator teeth 16 held in the cast ring in equiangular spaced positions. The steps in this form of the method are otherwise the same as the method illustrated in FIGS. 1-4, except that the holding cylinder can, if desired, be cast around the teeth 16.

In the preferred embodiment as described, axial slots equally spaced as designated at 20 are milled in brass cylinder 10 as shown in the drawing. Then, stator teeth 12 are fixtured into the slots and silver soldered in position as shown at 22 in FIG. 3. Preferably, the stator teeth are machined from a suitable grade of steel, although in production, they can be formed by stamping.

Figure 4:
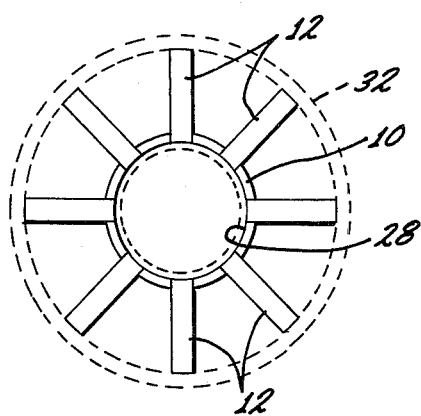
FIG. 4 is a schematic, sectional veiw illustrating another step of the method.
Figure 3:
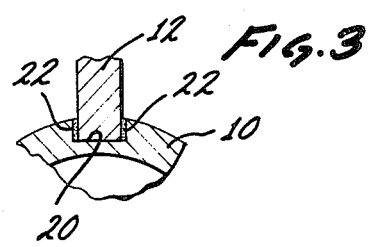
FIG. 3 is a detail view illustrating the securement of stator teeth to the ring shaped member or cylinder.
Figure 5:
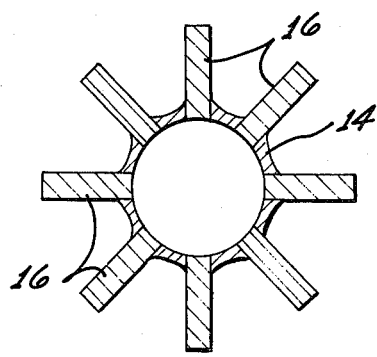
FIG. 5 is a schematic view illustrating a modified type of method.

After the stator teeth are secured into cylinder slots 20, the inside diameter of cylinder 10 is machined to expose the inner ends of the stator teeth, that is, on the inside diameter of tube 10 as shown in the drawings at 28 in FIG. 4. The inner ends or edge portions of teeth 12 are flush with the inside diameter 28.

The teeth must project through the cylinder so that a minimum air gap can be established between the stator teeth and the rotor teeth, not shown. It is to be understood that the rotor used may be typical of rotors presently used in stepper motors of this type, that is, the rotor may be of a cylindrical permanent magnet type with peripheral teeth. The rotor and the circuity of the windings used may be like are that of U.S. Pat. No. 3,428,837.

After machining the inside diameter of tube 10, the assembly is fluidized to provide insulation of the windings from all metal parts. At this point in the method, the stator is ready either for winding or insertion of preformed coils into the spaces between the teeth. FIG. 1 shows coils 30 between spaced teeth 12. The coils are inserted from the outside periphery. They may be wound around the teeth, the coil insertion being a machine process step.

Preferably, at this point, the assembly is varnished and baked and is now ready for placement into a housing 32 which functions as the magnetic return path for the flux which is crossing the air gap between the stator and rotor teeth. The housing is formed of a cylinder of magnetic material into which the stator assembly is inserted. The relationship of parts and the field is illustrated in FIG. 1.

The method of fabrication as described realizes a number of advantages including that electrical iron having a silicon content of 1–2% is not required, thus reducing costs. Typical laminations (approximately 45 pieces 0.025 inches thick) are replaced by the eight stator teeth which are preferably stamped parts made from inexpensive screw machine stock, as for example, B1113 steel. Housing 32 is preferably made from B1113 steel, functioning both as a housing and a magnetic circuit, thus eliminating the aluminum housing used in conventional motors. The stator coils may be either wound by machine or preformed and then inserted around or between the stator teeth, eliminating the insertion procedure whereby a worker must insert the coils through narrow openings on the inside diameter or periphery of the conventional type of stator.

It is important to point out that the method of fabrication is calculated to reduce the labor content, for example, that required in insertion of coils into the conventional stator stack. A further reduction of labor is realized by the particular design of the configuration and reduction of machining as well as assembly time. The selection of material is such as to realize economic gains.

The construction as described has resulted in successful performance sufficient to realize marketability and more efficient use of materials. The stator can be inserted into a ferrous steel housing, if desired, which functions as the back side of the stator and completes the magnetic circuit.

A motor with a stator constructed in accordance with the methods described herein appears as illustrated in FIG. 1. As shown, the windings are positioned between the stator teeth with the stator within cylinder 32. End caps with bearings for journalling the rotor shaft may be provided in accordance with constructions already known. It can be observed that all of the objects as set forth in the foregoing, as well as the advantages are realized from the method and in the finished product. The development of the herein invention determined that a laminated stator is not required. High silicon content iron is not required. Standard screw machine stock steel, B1113 or C1214 provides a suitable magnetic circuit. Sintered iron stators may be satisfactorily utilized, particularly in short stacks, that is, where the ratio of length to tooth width is low. The closed slot stator as described herein is easy to wind on a machine, particularly the winding configuration as shown herein.

The foregoing disclosure is representative of preferred forms of the invention and is to be interpreted in an illustrative rather than a limiting sense, the invention to be accorded the full scope of the claims appended hereto.

What is claimed is:

1. A method of construction of an unlaminated motor stator comprising the steps of: forming individual, unlaminated stator teeth; forming a ring shaped member as a tubular member, milling equally angularly spaced axial slots on the outside of the tubular member, inserting the teeth into said slots and permanently securing them to the tubular member; milling out the inside of the tubular member to expose the inner ends of the teeth and render them flush with the milled inner surface of the tubular member; applying windings in a position to occupy spaces between radially positioned teeth; and applying a magnetic, cylindrical member around the radially positioned teeth and in contact with them.

2. A method as in claim 1, including the step of soldering the teeth to the tubular member.

* * * * *